United States Patent
Nam et al.

(10) Patent No.: US 11,838,422 B1
(45) Date of Patent: Dec. 5, 2023

(54) USER AUTHENTICATION METHOD AND UNMANNED DELIVERY SYSTEM BASED ON USER AUTHENTICATION

(71) Applicant: RESEARCH COOPERATION FOUNDATION OF YEUNGNAM UNIVERSITY, Gyeongsan-si (KR)

(72) Inventors: Seung Yeob Nam, Daegu (KR); Yu Na Park, Ulsan (KR); Seong Eun Yang, Pohang-si (KR)

(73) Assignee: RESEARCH COOPERATION FOUNDATION OF YEUNGNAM UNIVERSITY, Gyeongsan-si (KR)

( * ) Notice: Subject to any disclaimer, the term of this patent is extended or adjusted under 35 U.S.C. 154(b) by 0 days.

(21) Appl. No.: 18/110,277

(22) Filed: Feb. 15, 2023

(51) Int. Cl.
*H04L 29/06* (2006.01)
*H04L 9/32* (2006.01)
(Continued)

(52) U.S. Cl.
CPC .......... *H04L 9/3228* (2013.01); *G06K 7/1417* (2013.01); *G06K 19/06037* (2013.01);
(Continued)

(58) Field of Classification Search
None
See application file for complete search history.

(56) References Cited

U.S. PATENT DOCUMENTS 8,838,973 B1 * 9/2014 Yung ................... H04L 63/1483
713/172
8,862,888 B2 * 10/2014 Tolba .................... H04L 9/0866
713/172

(Continued)

FOREIGN PATENT DOCUMENTS

CN 114449515 A * 5/2022
CN 114449515 A 5/2022
(Continued)

OTHER PUBLICATIONS

Jiapie Yang et al., "Design, analysis and implementation of a smart next generation secure shipping infrastructure using autonomous robot", Computer Networks 187 (2021) pp. 1-15 (Year: 2021).*

(Continued)

*Primary Examiner* — Andrew J Steinle
(74) *Attorney, Agent, or Firm* — Bridgeway IP Law Group, PLLC; Sang Ho Lee; Hyun Woo Shin

(57) ABSTRACT

A user authentication method performed in an unmanned delivery system including a server, a buyer customer device, a deliveryman customer device, and an autonomous delivery vehicle includes: generating, by the server, a session key based on order information received from the buyer customer device, and transmitting the generated session key to the deliveryman customer device and the buyer customer device; generating, by the deliveryman customer device, a One-Time Password (OTP) based on the session key; applying, by the deliveryman customer device as a first application step, a hash function to the OTP a first predetermined number of times; additionally applying, by the deliveryman customer device as a second application step, the hash function to the OTP generated in the first application step a second predetermined number of times; and generating, by the deliveryman customer device, a first Quick Response (QR) code based on the OTP generated in the second application step.

5 Claims, 7 Drawing Sheets

(51) Int. Cl.
  *G06Q 10/083* (2023.01)
  *G06K 7/14* (2006.01)
  *G06K 19/06* (2006.01)
  *H04L 9/08* (2006.01)

(52) U.S. Cl.
  CPC ........... *G06Q 10/083* (2013.01); *H04L 9/085* (2013.01); *H04L 9/3242* (2013.01)

(56) References Cited

U.S. PATENT DOCUMENTS

| | | | |
|---|---|---|---|
| 10,963,871 B2 * | 3/2021 | Safak | ................... G06Q 20/34 |
| 2018/0167394 A1 | 7/2018 | High et al. | |

FOREIGN PATENT DOCUMENTS

| | | | |
|---|---|---|---|
| KR | 10-2015-0045724 A | 4/2015 | |
| KR | 10-2020-0132431 A | 11/2020 | |
| KR | 10-2021-0048124 A | 5/2021 | |
| KR | 10-2021-0096719 A | 8/2021 | |
| WO | 2021/110862 A1 | 6/2021 | |

OTHER PUBLICATIONS

Jiapie Yang et al., "Design, analysis and implementation of a smart next generation secure shipping infrastructure using autonomous robot", Computer Networks 187 (2021) pp. 1-15.

\* cited by examiner

USER AUTHENTICATION METHOD AND UNMANNED DELIVERY SYSTEM BASED ON USER AUTHENTICATION

BACKGROUND

1. Field

The present disclosure relates to a user authentication method and an unmanned delivery system based on user authentication, and more particularly, to a user authentication method and an unmanned delivery system based on user authentication that can prevent hacking.

2. Description of the Related Art

Due to COVID-19, there is a growing social atmosphere avoiding face-to-face contacts. In this atmosphere, delivery methods are also changing, and in particular, there is a growing need for autonomous delivery systems to minimize unnecessary contacts between customers and delivery persons and improve delivery convenience.

Many delivery vehicles are being developed, but the existing autonomous delivery vehicles employ an authentication system whereby a user inputs the last four digits of the user's mobile phone number or the user's designated password and picks up his/her product.

However, this method has inconvenience and dangers of hacking (man-in-the-middle attack) since any person who knows the user's mobile phone number can receive the delivered product.

SUMMARY

The present disclosure is designed to solve the above-described problem, and therefore the present disclosure is directed to providing a user authentication method that can prevent dangers of hacking (man-in-the-middle attack) by building an unmanned delivery system based on user authentication with enhanced security using One Time Password (OTP), Hash, and encryption algorithms in autonomous delivery systems and an unmanned delivery system based on such user authentication.

Another purpose of the present disclosure is to provide a user authentication method for unmanned delivery that ensures data integrity by using a time-based OTP algorithm using different key values each time to prevent the reuse and overlap of key values and making it infeasible to reverse-calculate in the secure Hash function in the event of hacking (man-in-the-middle attack) and an unmanned delivery system based on such user authentication.

The present disclosure is further directed to providing a user authentication method that improves data security through encryption and decryption using a private key between users, achieving more convenient and faster user authentication based on quick response (QR) authentication and allowing users to easily receive products and an unmanned delivery system based on such user authentication.

Technical Solutions

To achieve the above-described objectives, a user authentication method performed in an unmanned delivery system includes a server, a buyer customer device, a deliveryman customer device and an autonomous delivery vehicle according to an embodiment of the present disclosure includes a session key transmission step of generating, by the server, a session key based on order information received from the buyer customer device, and transmitting the generated session key to the deliveryman customer device and the buyer customer device; an OTP generation step of generating, by the deliveryman customer device, an OTP based on the session key; a first application step of applying, by the deliveryman customer device, a hash function to the OTP a preset number of times; a second application step of additionally applying, by the deliveryman customer device, the hash function to the OTP generated in the first application step a preset number of times; and a first QR code generation step of generating, by the deliveryman customer device, a first QR code based on the OTP generated in the second application step.

Here, the user authentication method may further include a secret key generation step of generating, by the deliveryman customer device, a secret key by encrypting the OTP generated in the first application step; and a secret key transmission step of transmitting, by the deliveryman customer device, the generated secret key to the buyer customer device through the server.

Additionally, the user authentication method may further include a second QR code generation step of generating, by the buyer customer device, a second QR code by decrypting the encrypted secret key using the session key, wherein the second QR code is different from the first QR code.

Additionally, the user authentication method may further include a user authentication step of recognizing, by the autonomous delivery vehicle, the first QR code and the second QR code and determining if whether the first QR code and the second QR code match.

Additionally, the user authentication step may include a third application step of additionally applying, by the autonomous delivery vehicle, the hash function to the OTP generated in the first application step, included in the second QR code, a preset number of times, and determining if the OTP generated in the third application step and the OTP included in the first QR code match by comparing them.

Meanwhile, to achieve another objective, an unmanned delivery system based on user authentication according to an embodiment of the present disclosure includes a server; a buyer customer device, a deliveryman customer device, and an autonomous delivery vehicle, wherein the server is configured to generate a session key based on order information received from the buyer customer device and transmit the generated session key to the buyer customer device and the deliveryman customer device; wherein the deliveryman customer device is configured to generate a first QR code based on the session key and make the autonomous delivery vehicle recognize the generated first QR code; wherein the buyer customer device is configured to generate a second QR code based on the session key, wherein the second QR code is different from the first QR code; and wherein the autonomous delivery vehicle is configured to autonomously drive to a destination based on destination coordinates included in the first QR code, recognize the second QR code from the buyer customer device and open a door when user authentication is completed.

Here, the deliveryman customer device may be configured to generate an OTP based on the session key, apply a hash function to the OTP N times, encrypting the OTP to which the hash function is applied the N times to generate a secret key and transmit the secret key to the buyer customer device through the server.

Additionally, the deliveryman customer device may be configured to additionally apply the hash function M times to the OTP to which the hash function is applied the N time, and generate the first QR code based on the OTP to which the hash function is additionally applied the M times.

Additionally, the buyer customer device may be configured to generate the second QR code by decrypting the encrypted secret key using the session key.

Additionally, the autonomous delivery vehicle may be configured to perform the user authentication by determining if the first QR code and the second QR code match.

Here, the autonomous delivery vehicle may be configured to additionally apply the hash function the M times to the OTP to which the hash function is applied the N times, included in the second QR code, and determine if the OTP to which the hash function is additionally applied the M times matches the OTP included in the first QR code by comparing them.

Effect Of Invention

The user authentication method and the unmanned delivery system based on user authentication according to the present disclosure as described above can prevent dangers of hacking (man-in-the-middle attack) by building the unmanned delivery system based on user authentication with enhanced security using OTP, Hash and encryption algorithms in indoor autonomous delivery systems.

Additionally, the user authentication method and the unmanned delivery system based on user authentication according to the present disclosure can ensure data integrity by using different key values each time to prevent the reuse and overlap of key values using the time-based OTP algorithm and making it infeasible to reverse-calculate in the secure Hash function in the event of hacking (man-in-the-middle attack).

Additionally, the user authentication method and the unmanned delivery system based on user authentication according to the present disclosure can improve data security through encryption and decryption using a private key between users, achieve more convenient and faster user authentication based on QR authentication and allow users to easily receive products.

DETAILED DESCRIPTION

Figure 1:
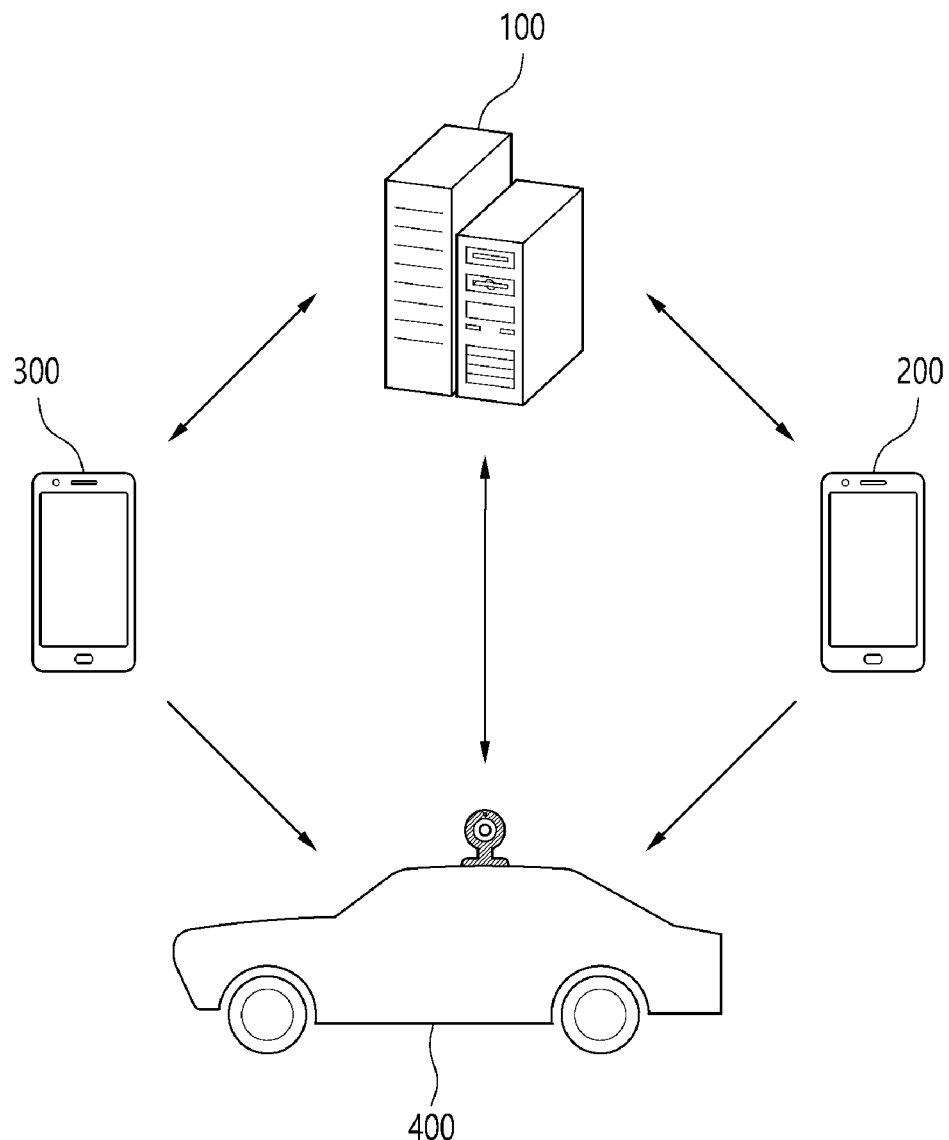
FIG. 1 is a schematic diagram of an unmanned delivery system based on user authentication according to an embodiment of the present disclosure.

The following detailed description of the present disclosure is made with reference to the accompanying drawings showing particular embodiments for practicing the present disclosure for illustration purpose. These embodiments are described in sufficient detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs indicate same or similar functions in many aspects.

Hereinafter, exemplary embodiments of the present disclosure will be described in more detail with reference to the accompanying drawings.

FIG. 1 is a schematic diagram of an unmanned delivery system based on user authentication according to an embodiment of the present disclosure.

The elements according to the present disclosure may be elements defined by functional classification, not physical classification, and may be defined by the function performed by each element. Each element will be implemented in hardware or a program code that performs each function and a processing unit, and the functions of two or more elements may be incorporated into one element. Accordingly, in the following embodiment, the name given to the element is not intended to physically divide each element and is given to imply the representative function performed by each element, and it should be noted that the technical spirit of the present disclosure is not limited by the name of the element.

The unmanned delivery system based on user authentication according to this embodiment is designed to achieve secure product delivery by preventing dangers of man-in-the-middle attack, i.e., hacking through enhanced user authentication.

To this end, the unmanned delivery system based on user authentication includes a server 100, a buyer customer device 300, a deliveryman customer device 200 and an autonomous delivery vehicle 400. Software (an application) for performing a user authentication method may be installed and run on each of the server 100, the buyer customer device 300, the deliveryman customer device 200 and the autonomous delivery vehicle 400, and the configuration of each device may be controlled by the software for performing a user authentication method.

First, the server 100 may be connected to the buyer customer device 300, the deliveryman customer device 200 and the autonomous delivery vehicle 400 via a network, and may designate the deliveryman customer device 200 to provide a product to be delivered based on order information received from the buyer customer device 300.

Additionally, when the deliveryman customer device 200 that will provide the product is designated, the server 100 may allow the autonomous delivery vehicle 400 to move to a location of a delivery man who uses the deliveryman customer device 200. Additionally, the server 100 may store and manage identification information for identifying a plurality of autonomous delivery vehicles 400, and monitor locations of the plurality of autonomous delivery vehicles 400.

Additionally, when the order information is received from the buyer customer device 300, the server 100 may generate a session key based on the time when the order information is received. The detailed description of the server 100 will be provided below in FIG. 2.

Meanwhile, the deliveryman customer device 200 is a terminal possessed by the delivery man who delivers the product ordered by the buyer customer device 300, and may receive input identification information for identifying the delivery man. Additionally, when the deliveryman customer device 200 receives the order information through the server 100, the deliveryman customer device 200 may generate order confirmation information including a check message confirming the reception completion of the order information and transmit it to the server 100.

Additionally, the deliveryman customer device 200 may generate a first quick response (QR) code based on the session key received from the server 100, and have the autonomous delivery vehicle 400 to recognize the generated first QR code. Through this, the autonomous delivery vehicle 400 may identify the buyer customer device 300 that will receive the stored product, thereby achieving secure product delivery. The detailed description of the deliveryman customer device 200 will be provided below in FIG. 3.

Meanwhile, the buyer customer device 300 is a device possessed by a buyer customer who places an order of the product, and may receive input identification information for identifying the buyer customer. Additionally, when the buyer customer inputs the order information of the product to be delivered that the buyer customer wants to receive, the buyer customer device 300 may transmit the order information to the server 100.

Additionally, the buyer customer device 300 may generate a second QR code based on the session key received from the server 100, and allow the autonomous delivery vehicle 400 to recognize the generated second QR code, for the buyer customer device 300 to receive the product stored in the autonomous delivery vehicle 400.

Additionally, the buyer customer device 300 may receive, from the server 100, delivery status information of the product to be delivered such as a delivery start time and an expected arrival time of the product to be delivered. The detailed description of the buyer customer device 300 will be provided below in FIG. 4.

Meanwhile, the autonomous delivery vehicle 400 is managed by the server 100, and is configured to store the product provided by the delivery man who possesses the deliveryman customer device 200, and moves the stored product to a destination at which the buyer customer who possesses the buyer customer device 300 is located to allow the buyer customer to receive the product.

To this end, the autonomous delivery vehicle 400 stores the first QR code recognized from the deliveryman customer device 200, and determine if the second QR code recognized from the buyer customer device 300 at the destination matches the stored first QR code recognized from the deliveryman customer device 200 by comparing them to authenticate the user.

Additionally, when the autonomous delivery vehicle 400 determines that the first QR code and the second QR code match, the autonomous delivery vehicle 400 may open the door to allow the buyer customer to receive the product.

The autonomous delivery vehicle 400 may include a space for storing the product and the door for opening and closing the space, and the autonomous delivery vehicle 400 may include a vehicle as shown, but is not limited thereto and may be a moveable device capable of moving the product, including a robot, a cart and a rack.

Since the delivery process including receiving the order information from the buyer customer through the server 100, identifying the delivery man based on the received order information and moving the product provided by the delivery man can be adequately inferred from the common technology, in this embodiment, the detailed description is omitted.

In the present disclosure, an authentication methods between the server 100, the deliveryman customer device 200, the buyer customer device 300 and the autonomous delivery vehicle 400 of the unmanned delivery system based on user authentication will be described in detail.

Figure 2:
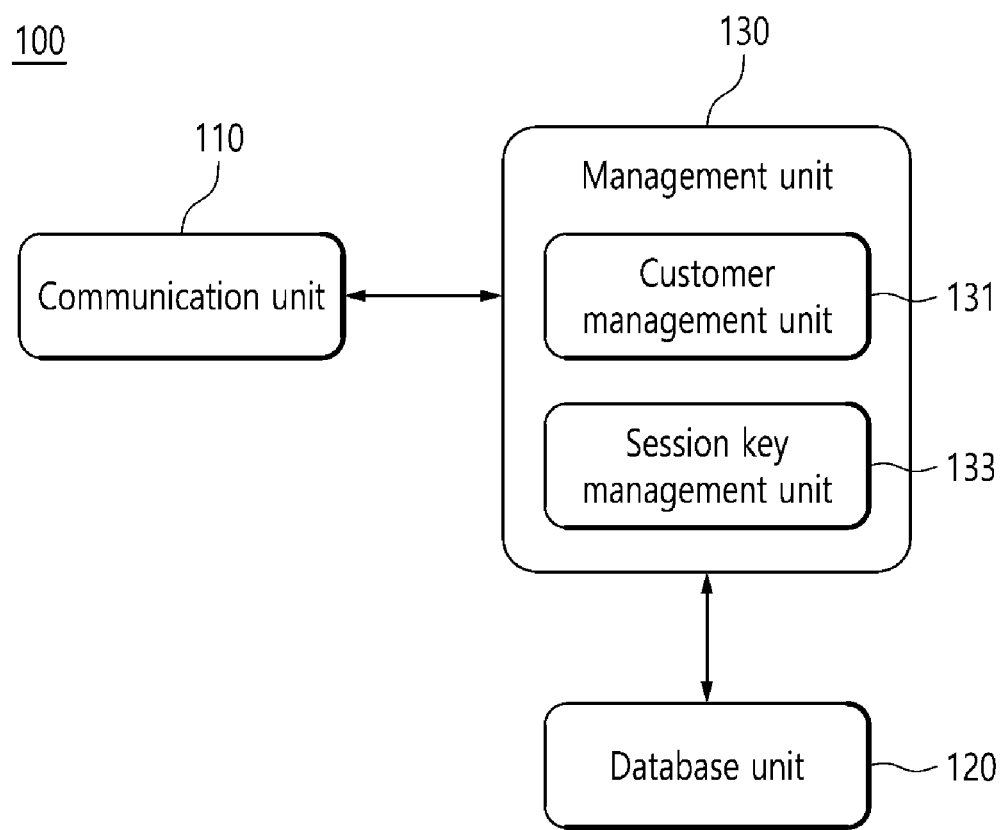
FIG. 2 is a block diagram illustrating the configuration of a server according to an embodiment of the present disclosure.

FIG. 2 is a block diagram illustrating the configuration of the server 100 according to an embodiment of the present disclosure.

As described above, the server 100 is connected to the buyer customer device 300, the deliveryman customer device 200 and the autonomous delivery vehicle 400, and is provided as an intervening medium between the buyer customer device 300 and the deliveryman customer device 200 to securely transmit data.

Additionally, the server 100 may match the buyer customer device 300 and the deliveryman customer device 200 in a one-to-one correspondence based on the order information received from the buyer customer device 300.

To this end, the server 100 includes a communication unit 110, a management unit 130 and a database unit 120.

The communication unit 110 is configured to transmit and receive various information between the buyer customer device 300, the deliveryman customer device 200 and the autonomous delivery vehicle 400 via the network, and the information received through the communication unit 110 may be stored in the database unit 120.

Additionally, the communication unit 110 may transmit the session key generated by a session key management unit 133 to the buyer customer device 300 and the deliveryman customer device 200, and when an encrypted secret key is received from the deliveryman customer device 200, the received secret key may be transmitted to the buyer customer device 300.

Meanwhile, the database unit 120 is configured to store the information transmitted and received between the server 100, and the buyer customer device 300, the deliveryman customer device 200 and the autonomous delivery vehicle 400, and the database unit 120 may store at least one of buyer customer identification information for identifying the buyer customer, deliveryman identification information for identifying the delivery man, autonomous delivery vehicle identification information identifying the autonomous delivery vehicle 400 or map information.

Additionally, the database unit 120 may store and manage the order information, the delivery status and information associated with delivery from at least one of the buyer customer device 300 or the deliveryman customer device 200.

Additionally, the database unit 120 may store the software (application) for performing a user authentication method, and may also store the secret key received from the deliveryman customer device 200.

The management unit 130 is configured to generate and control the information transmitted and received between the buyer customer device 300, the deliveryman customer device 200 and the autonomous delivery vehicle 400, and may include a customer management unit 131 and the session key management unit 133.

When the order information is received from the buyer customer device 300, the customer management unit 131 may identify the deliveryman customer device 200 that can provide the product included in the received order information to match the buyer customer device 300 with the deliveryman customer device 200.

The customer management unit 131 may transmit the order information to the deliveryman customer device 200 located at the closest location from the location of the buyer customer while the location of the buyer customer is included in the received order information, and the customer management unit 131 may match the corresponding deliveryman customer device 200 with the buyer customer device 300 when the order confirmation information including the address of the buyer customer and the check message confirming the reception of the order information is received from the deliveryman customer device 200 having transmitted the order information.

Additionally, the customer management unit 131 may identify the autonomous delivery vehicle 400 standing by at the closest location from the location of the matched deliveryman customer device 200 to allow the identified autonomous delivery vehicle 400 to move to the location of the deliveryman customer device 200.

Meanwhile, the session key management unit 133 is configured to generate the session key. When the matching between the deliveryman customer device 200 and the buyer customer device 300 is completed, the session key management unit 133 may randomly generate the session key on the basis of the time of the placement of the order included in the order information. Additionally, the generated session key may be transmitted to each of the buyer customer device 300 and the deliveryman customer device 200 through the communication unit 110.

The session key generation algorithm by the session key management unit 133 may be defined as the following [Pseudocode 1].

[Pseudocode 1]
def generateSessionKey(skey)
string=skey
OTP= ˮ
length=len(string)
for i in range(6) :
    OTP+=string[math.floor(random.random( ) * length)]
return OTP Additionally, when the encrypted secret key is received from the deliveryman customer device 200, the session key management unit 133 may control the communication unit 110 to transmit the secret key to the buyer customer device 300 matched with the deliveryman customer device 200 having transmitted the secret key.

Figure 3:
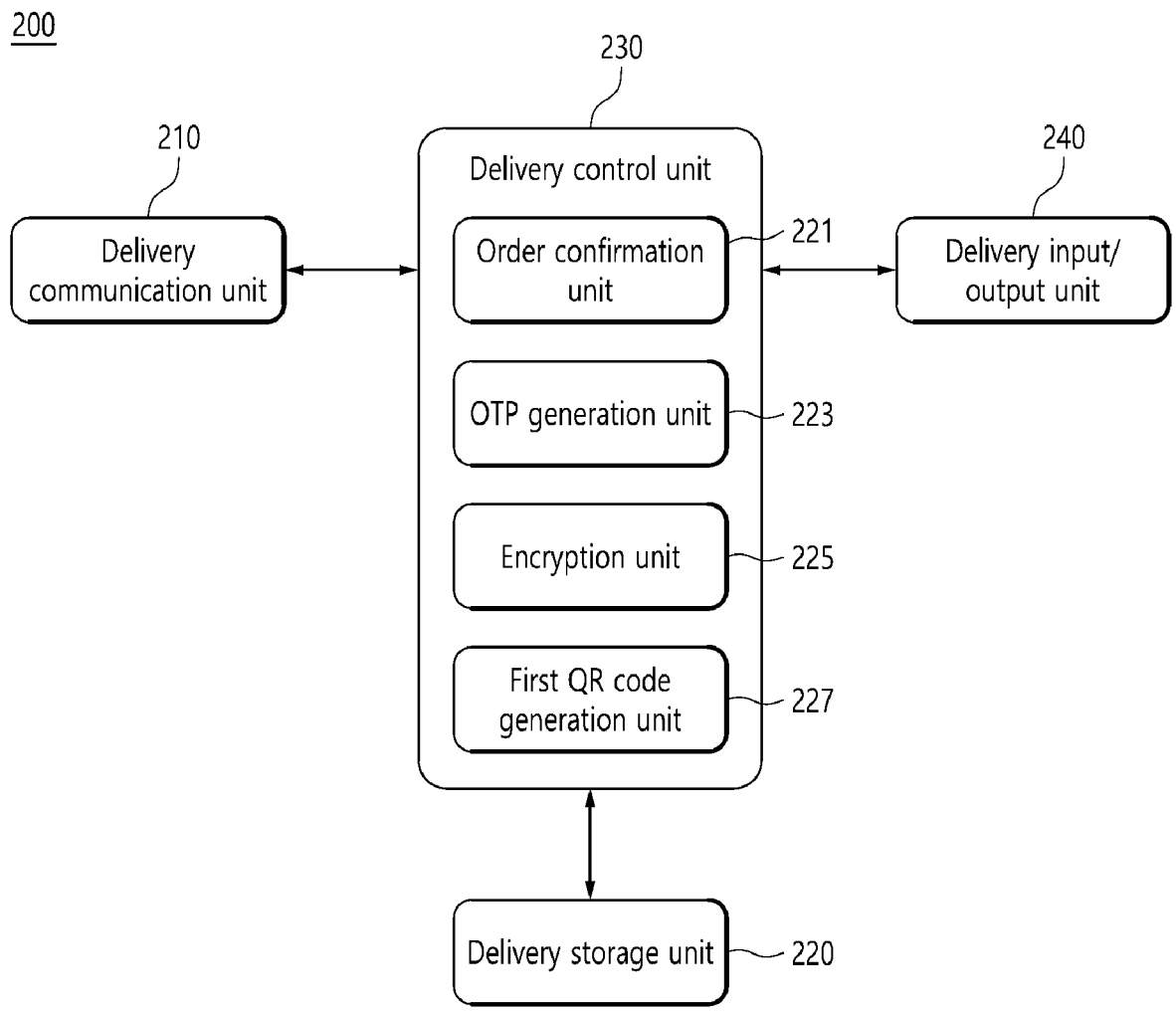
FIG. 3 is a block diagram illustrating the configuration of a deliveryman customer device according to an embodiment of the present disclosure.

Meanwhile, FIG. 3 is a block diagram illustrating the configuration of the deliveryman customer device 200 according to an embodiment of the present disclosure.

The deliveryman customer device 200 is a device possessed by the delivery man for providing the product included in the order information received from the server 100, and may be configured to generate the secret key to securely provide the product to the buyer customer through the autonomous delivery vehicle 400. To this end, the deliveryman customer device 200 may include a delivery communication unit 210, a delivery storage unit 220, a delivery control unit 230 and a delivery input/output unit 240.

The delivery communication unit 210 is configured to transmit and receive various information to/from the server 100, and the information transmitted and received through the delivery communication unit 210 may be stored in the delivery storage unit 220.

Additionally, the delivery storage unit 220 may store the identification information for identifying the delivery man, the address of the delivery man, and the software (application) for performing a user authentication method. Additionally, the delivery storage unit 220 may store information for generating a One Time Password (OTP) value based on the session key received from the server 100, information of a hash function applied to the generated OTP value, and information for encrypting the OTP to which the hash function is applied.

Meanwhile, the delivery control unit 230 is configured to generate the order confirmation information and the first QR code based on the session key received from the server 100, and may include an order confirmation unit 221, an OTP generation unit 223, an encryption unit 225, and a first QR code generation unit 227.

The delivery control unit 230 may be controlled according to the application stored in the delivery storage unit 220, and may control the delivery input/output unit 240 to output a login button to the delivery man together with an empty box for the input of an ID and a password of the delivery man.

Additionally, when the corresponding ID and password is inputted from the delivery man and the login button is clicked through the delivery input/output unit 240, the delivery control unit 230 may transmit the information of the delivery man to the server 100. Subsequently, when login of the delivery man is completed, the delivery control unit 230 may control the delivery input/output unit 240 to output an address input box for the delivery man, an order details confirmation button, and an authentication button. The address input box for the delivery man may be set to automatically input the address of the delivery man pre-stored in the delivery storage unit 220.

Meanwhile, when the order information is received from the server 100, the order confirmation unit 221 is configured to generate the order confirmation information including the address of the delivery man and the check message confirming the reception of the order information. The order confirmation information may be generated when the delivery man clicks the order details confirmation button on the screen outputted from the delivery input/output unit 240. Additionally, the order confirmation unit 221 transmits the generated order confirmation information to the server 100.

The OTP generation unit 223 is configured to generate the OTP, and may generate the OTP value based on the received session key when the session key generated by the server 100 is received.

The OTP value may be generated when the delivery man clicks the authentication button outputted from the delivery input/output unit 240 after the deliveryman customer device 200 receives the session key from the server 100. The OTP value generated by the OTP generation unit 223 is an OTP seed value, and the generated OTP value may be transmitted to the encryption unit 225.

Meanwhile, the encryption unit 225 applies the hash function (SHA-256) stored in the delivery storage unit 220 to the OTP value generated by the OTP generation unit 223 a preset number of times N. Additionally, the encryption unit 225 generates the encrypted secret key by applying the symmetric key encryption algorithm to the OTP value to which the hash function is applied the preset number of times N, and transmits the generated secret key to the buyer customer device 300 through the server 100. For example, the encryption unit 225 may use the Vigenere encryption algorithm to generate the secret key, but is not limited thereto.

Additionally, after the secret key is transmitted to the server 100, the encryption unit 225 may additionally apply the corresponding hash function a preset number of times M to the OTP value to which the hash function is applied the number of times N. Additionally, the encryption unit 225 may transmit the OTP value to which the hash function is applied N+M times to the first QR code generation unit 227.

Here, each of N and M is an integer of 1 or greater, and N and M may be preset in the delivery storage unit 220. Describing under the assumption that each of N and M is 1, the encryption unit 225 applies the hash function to the OTP value generated by the OTP generation unit 223 one time, encrypts the OTP value to which the hash function is applied one time to generate the secret key, and transmits it to the server 100. Subsequently, the encryption unit 225 may additionally apply the hash function one more time to the OTP value to which the hash function is applied one time, and transmit the OTP value to which the hash function is applied twice in total to the first QR code generation unit 227 without encryption.

Accordingly, the encryption unit 225 may generate the OTP seed value for each of the OTP value to which the hash function is applied N times and the OTP value to which the hash function is applied N+M times.

The first QR code generation unit 227 is configured to generate the first QR code that will be recognized by the autonomous delivery vehicle 400, receive the OTP value to which the hash function is applied N+M times from the encryption unit 225, and generate the first QR code using the OTP value to which the hash function is applied N+M times. Additionally, the first QR code generation unit 227 may transmit the generated first QR code to the delivery input/output unit 240. In the above-described example, the first QR code is generated by using the OTP value to which the hash function is applied twice. The first QR code may include the OTP seed value and address information to which the product is delivered, and the first four digit number of the first QR code data may include destination information, the address information to which the product is delivered.

Meanwhile, the delivery input/output unit 240 may output the first QR code received from the first QR code generation unit 227, and the delivery man may make the autonomous delivery vehicle 400 recognize the first QR code outputted from the delivery input/output unit 240 by enabling a web camera in the autonomous delivery vehicle 400 to sense it.

Additionally, the delivery input/output unit 240 may be configured to receive various input information from the delivery man or output the information received through the delivery communication unit 210 and the delivery control unit 230. To this end, the delivery input/output unit 240 may include a touch screen capable of performing input and output operations at the same time, but is not limited thereto and each of the input unit and the output unit may be provided.

The delivery input/output unit 240 may be, as described above, controlled by the delivery control unit 230 and may output the login button together with the empty box for the input of the ID and password of the delivery man. Additionally, when login is completed by inputting the ID and password and clicking the login button, the address input box for the delivery man, the order details confirmation button, and the authentication button may be outputted. The screen outputted from the delivery input/output unit 240 will be outputted based on a User Interface (UI) included in the application.

Figure 4:
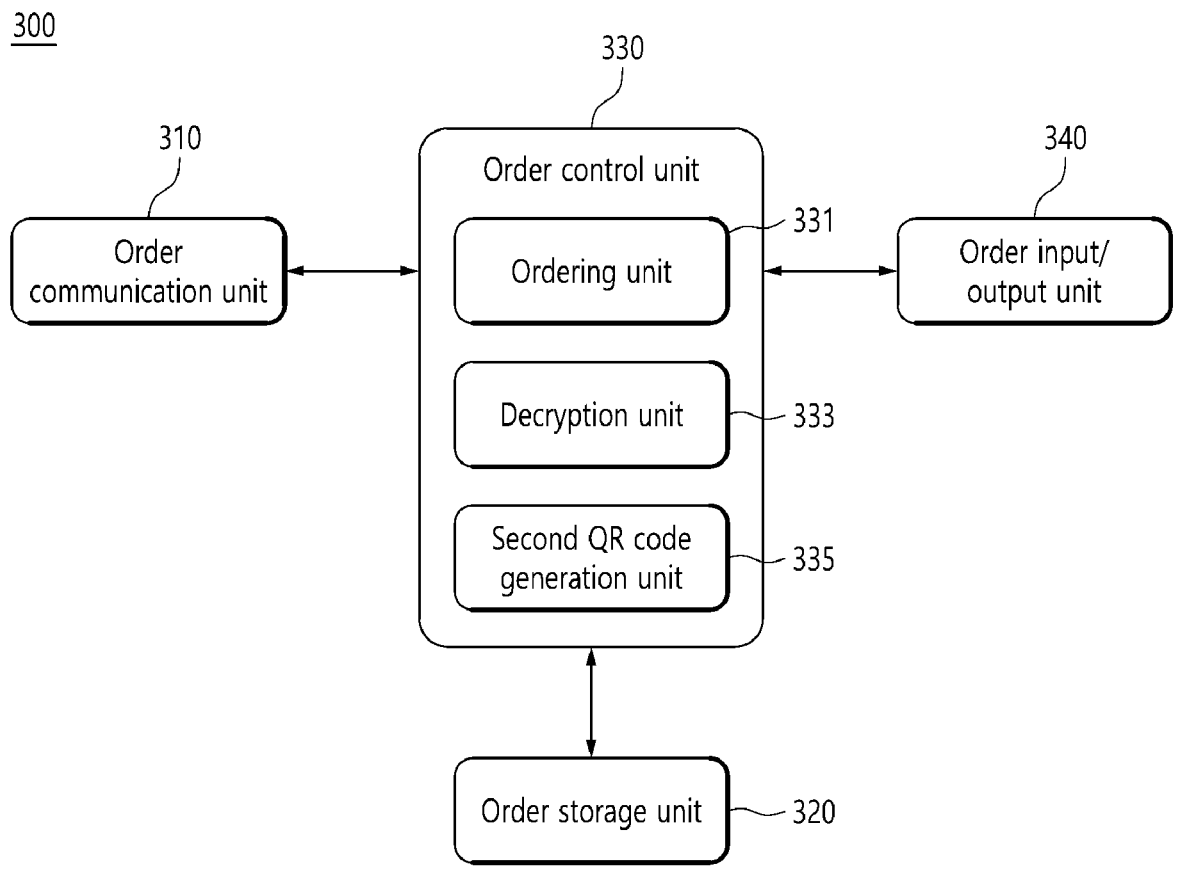
FIG. 4 is a block diagram illustrating the configuration of a buyer customer device according to an embodiment of the present disclosure.

Meanwhile, FIG. 4 is a block diagram illustrating the configuration of the buyer customer device 300 according to an embodiment of the present disclosure.

The buyer customer device 300 is a device possessed by the buyer customer and is configured to place an order of the product that the buyer customer wants to receive, and to generate the second QR code for receiving the product from the autonomous delivery vehicle 400. The buyer customer device 300 may include an order communication unit 310, an order storage unit 320, an order control unit 330, and an order input/output unit 340.

The order communication unit 310 may be configured to transmit and receive various information to/from the server 100.

The order storage unit 320 may store the identification information for identifying the buyer customer, the address of the buyer customer, the information received by the order communication unit 310, and the software for performing a user authentication method.

Additionally, the order storage unit 320 may store the session key received from the server 100 and the secret key received from the server 100.

Meanwhile, the order control unit 330 is configured to generate the order information based on the input information from the buyer customer and the second QR code necessary when receiving the delivered product, and may include an ordering unit 331, a decryption unit 333, and a second QR code generation unit 335.

The order control unit 330 may be controlled according to the application stored in the order storage unit 320, and may control the order input/output unit 340 to output a login button to the buyer customer together with an empty box for the input of an ID and a password of the buyer customer.

Additionally, when the corresponding ID and password are inputted from the buyer customer and the login button is clicked through the order input/output unit 340, the order control unit 330 may transmit the information of the buyer customer to the server 100. Subsequently, when login of the buyer customer is completed, the order control unit 330 may control the order input/output unit 340 to output an address input box for the buyer customer, an order button, and an authentication button. The order input box for the buyer customer may be set to automatically input the address of the buyer customer pre-stored in the order storage unit 320, and the automatically inputted address of the buyer customer may be changed by the buyer customer when necessary.

The ordering unit 331 is configured to generate the order information including the information of the product that the buyer customer needs and the address of the buyer customer inputted by the buyer customer through the order input/output unit 340. The order information may be generated when the buyer customer clicks the order button on the screen outputted from the order input/output unit 340 through the application (software) that is running. Additionally, the ordering unit 331 transmits the generated order information to the server 100.

After the order information generated by the ordering unit 331 is transmitted to the server 100, the order control unit 330 stands by until the order control unit 330 receives the session key from the server 100, and may transmit the received session key to the decryption unit 333 when the order control unit 330 receives the session key from the server 100. The session key is used as a key for the decryption of the secret key received from the deliveryman customer device 200.

Additionally, after the order control unit 330 receives the session key, the order control unit 330 may stand by until the order control unit 330 receives an arrival notification message from the server 100, and may receive the arrival notification message from the server 100 and an encrypted packet generated from the deliveryman customer device 200, i.e., the secret key through the server 100 at the same time. Here, the arrival notification message may be a notification such as "Your product will arrive in 5 minutes." or a message generated based on the order confirmation information that the server 100 received from the deliveryman customer device 200, but is not limited thereto, and the deliveryman customer device 200 may include the expected arrival time inputted from the delivery man in the order confirmation information and transmit it to the server 100, and the server 100 may only transmit it.

The decryption unit 333 is configured to decrypt the secret key. Specifically, after the decryption unit 333 receives the secret key from the server 100 and when the buyer customer clicks the authentication button outputted through the order input/output unit 340, the decryption unit 333 may decrypt the secret key using the session key received from the server 100. The OTP value to which the hash function decrypted by the decryption unit 333 is applied N times may be transmitted to the second QR code generation unit 335.

The second QR code generation unit 335 is configured to generate the second QR code that will be recognized by the autonomous delivery vehicle 400, and the second QR code generation unit 335 may receive the OTP value to which the hash function is applied N times from the decryption unit 333, and generate the second QR code using the OTP value to which the hash function is applied N times.

That is, the second QR code is a QR code based on the OTP value to which the hash function is applied N times, the first QR code is a QR code based on the OTP value to which the hash function is applied N+M times, and the first QR code and the second QR code are different QR codes. As a result, the first QR code of the delivery man and the second QR code data of the buyer customer have the same original, but are in different forms due to different number of times the hash function is applied, thereby preventing hacking (man-in-the-middle attack).

Additionally, the second QR code generation unit 335 may transmit the generated second QR code to the order input/output unit 340. The second QR code may include the address information and the OTP seed value, and the first four digit number of the second QR code data may include home information or home address information to which the autonomous delivery vehicle 400 will move after delivery is completed.

Meanwhile, the order input/output unit 340 may output the second QR code received from the second QR code generation unit 335, and the buyer customer may make the autonomous delivery vehicle 400 recognize the second QR code outputted from the order input/output unit 340 by enabling the web camera in the autonomous delivery vehicle 400 to sense it.

Additionally, the order input/output unit 340 may be configured to receive various input information from the buyer customer or to output the information received through the order communication unit 310 and the order control unit 330. To this end, the order input/output unit 340 may include a touch screen capable of performing input and output operations at the same time, but is not limited thereto and each of the input unit and the output unit may be provided.

The order input/output unit 340 may be, as described above, controlled by the order control unit 330, and may output the login button together with the empty box for the input of the ID and password of the buyer customer. Additionally, when login is completed by inputting the ID and password and clicking the login button, the address input box for the buyer customer, the order button, and the authentication button may be outputted. The screen outputted from the order input/output unit 340 will be outputted based on the User Interface (UI) included in the application.

Figure 5:
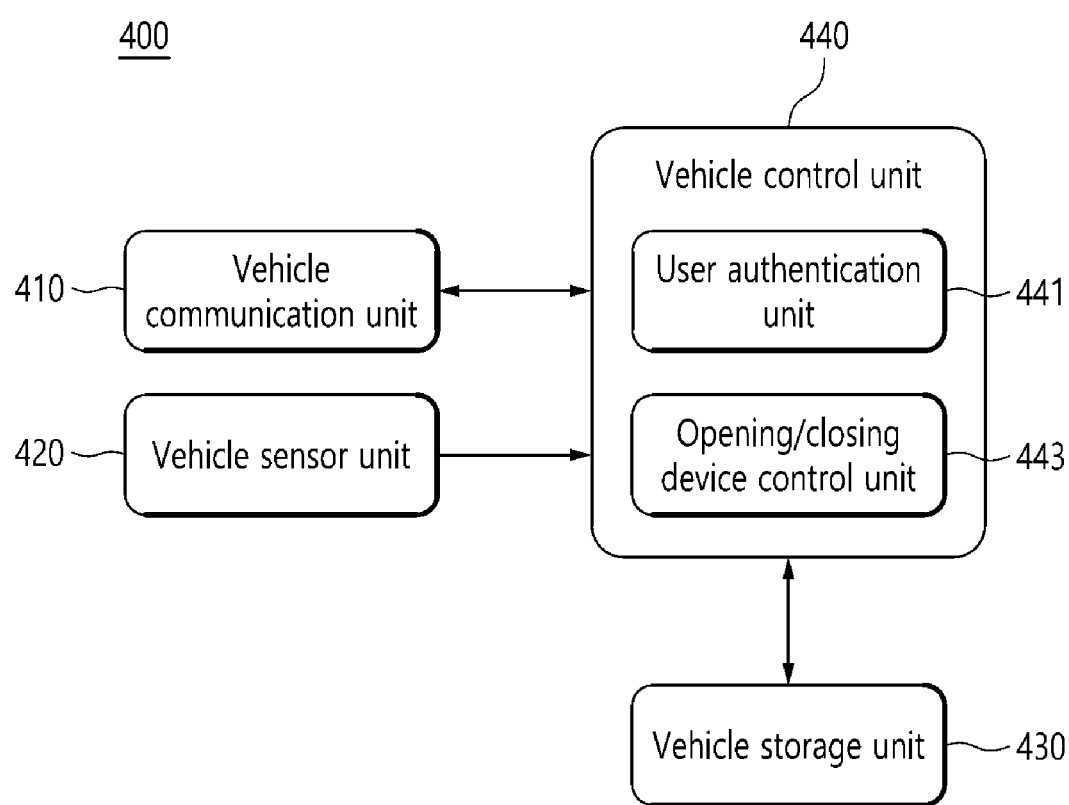
FIG. 5 is a block diagram illustrating the configuration of an autonomous delivery vehicle according to an embodiment of the present disclosure.

FIG. 5 is a block diagram illustrating the configuration of the autonomous delivery vehicle 400 according to an embodiment of the present disclosure. The autonomous delivery vehicle 400 according to this embodiment may be configured to allow the delivery man to deliver the product to the location of the buyer customer. The autonomous delivery vehicle 400 may include the space for loading the product being delivered and the door that is open and closed through a motor. The autonomous delivery vehicle 400 may include a vehicle communication unit 410, a vehicle sensor unit 420, a vehicle storage unit 430, and a vehicle control unit 440. Additionally, although not shown in the drawing, the autonomous delivery vehicle 400 may further include a door through which the product enters and exits.

The vehicle communication unit 410 is configured to transmit and receive various information to/from the server 100, and the information transmitted and received through the vehicle communication unit 410 may be stored in the vehicle storage unit 430.

The vehicle sensor unit 420 is configured to recognize the first QR code generated by the deliveryman customer device 200 or the second QR code generated by the buyer customer device 300, and the vehicle sensor unit 420 of this embodiment may include a web camera, but is not limited thereto.

When the vehicle sensor unit 420 recognizes the first QR code or the second QR code, the vehicle sensor unit 420 may transmit it to the vehicle control unit 440.

Meanwhile, the vehicle storage unit 430 may store the identification information for identifying the autonomous delivery vehicle 400, the map information, and the software (application) for performing a user authentication method. Additionally, the vehicle storage unit 430 may equally store the information of the hash function stored in the deliveryman customer device 200 to determine if the first QR code and the second QR code match.

The vehicle control unit 440 may perform user authentication to correctly deliver the product by the autonomous delivery vehicle 400, perform control to open the door to allow the buyer customer to receive the product when the buyer customer having placed an order of the stored product is authentic, and include a user authentication unit 441 and an opening/closing device control unit 443.

The user authentication unit 441 is configured to determine if the first QR code and the second QR code recognized by the vehicle sensor unit 420 match by comparing them. To this end, the user authentication unit 441 compares the second QR code recognized from the buyer customer device 300 after the arrival at the destination with the first QR code recognized from the deliveryman customer device 200 before the start of the delivery.

In this instance, the user authentication unit 441 may additionally apply the hash function M times to the OTP value to which the hash function included in the second QR code is applied N times using the hash function stored in the vehicle storage unit 430.

Additionally, the user authentication unit 441 may determine if data match by comparing the OTP value to which the M number of hash functions are applied to the second QR code with the OTP value to which the N+M number of hash functions included in the first QR code received from the deliveryman customer device 200 are applied. When the user authentication unit 441 determines that the two data match, the user authentication unit 441 may generate an open/close signal and transmit it to the opening/closing device control unit 443.

Meanwhile, the opening/closing device control unit 443 is configured to control an opening/closing device, i.e., the door of the autonomous delivery vehicle 400. When the opening/closing device control unit 443 receives the open/close signal from the user authentication unit 441, the opening/closing device control unit 443 may control the motor based on the open/close signal to open or close the door.

The vehicle control unit 440 including the user authentication unit 441 and the opening/closing device control unit 443 may autonomously drive based on the address information included in the first QR code or the second QR code.

When the first QR code is recognized from the deliveryman customer device 200, the vehicle control unit 440 may fetch the destination information included in the first four digit number of the first QR code data, search for the corresponding destination information in the map stored in the vehicle storage unit 430 to find a destination coordinate value and perform control to start driving to the corresponding location.

Additionally, after the second QR code is recognized from the deliveryman customer device 200 and the product is provided to the buyer customer, the vehicle control unit 440 may fetch the home information included in the first four digit number of the second QR code data, search for the corresponding home information in the map stored in the vehicle storage unit 430 to find a home coordinate value and perform control to start driving to the corresponding location. When the vehicle storage unit 430 has a pre-stored location information to which the autonomous delivery vehicle 400 should return, even if the home information is included in the second QR code, the vehicle control unit 440 may drive to the corresponding location based on the pre-stored location information regardless of the home information in the second QR code.

Figure 6:
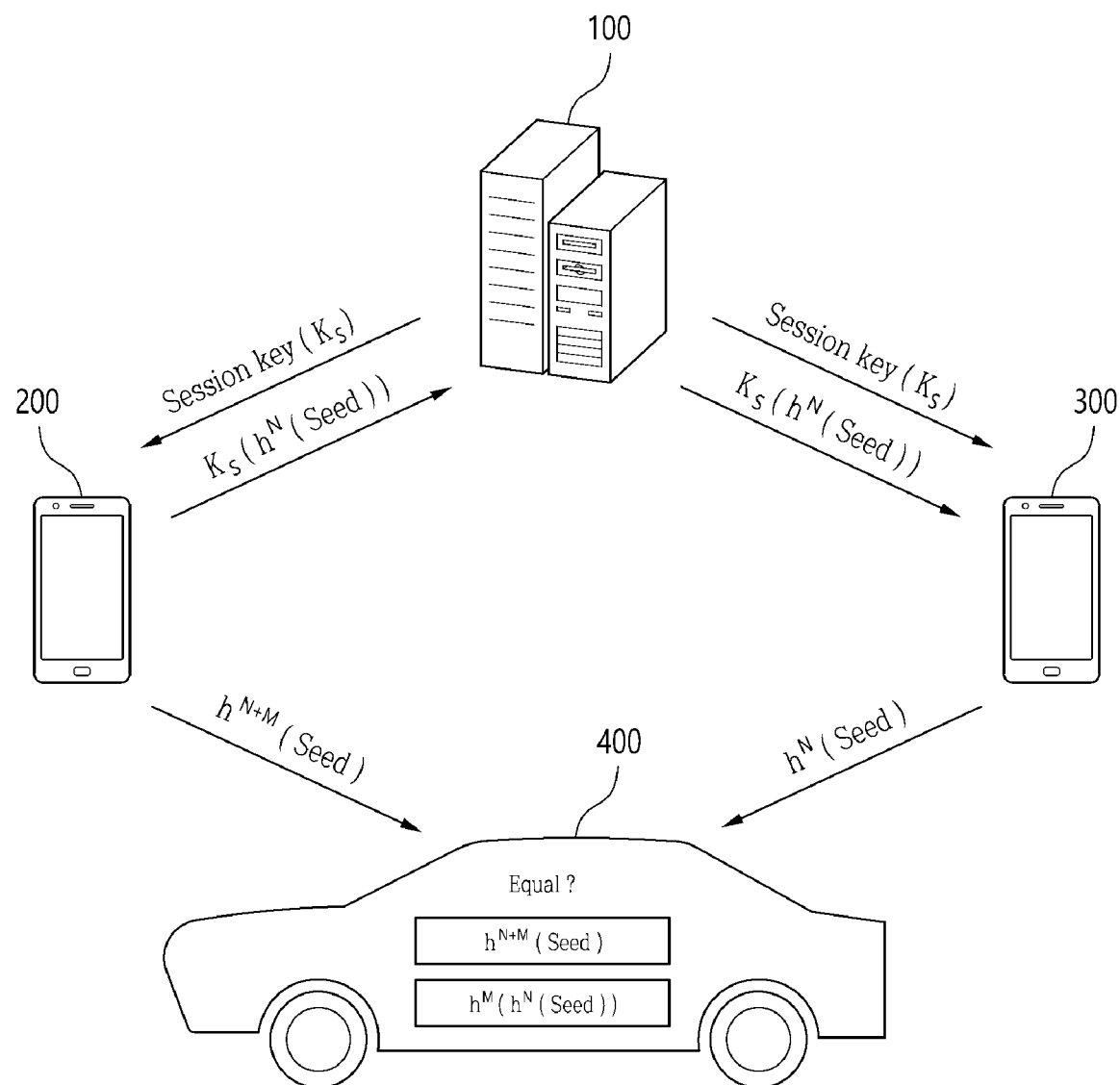
FIG. 6 is a schematic diagram illustrating a secret key that is transmitted and received in an unmanned delivery system based on user authentication according to an embodiment of the present disclosure.

FIG. 6 is a schematic diagram illustrating the secret key that is transmitted and received in the unmanned delivery system based on user authentication according to an embodiment of the present disclosure, and the detailed description provided in FIGS. 2 to 5 is omitted in FIG. 6. The transmission and reception of the secret key in the server 100, the deliveryman customer device 200, the buyer customer device 300, and the autonomous delivery vehicle 400 will be described.

First, when the deliveryman customer device 200 and the buyer customer device 300 are matched, the server 100 generates the session key $K_S$ and transmits the session key $K_S$ to the deliveryman customer device 200 and the buyer customer device 300.

Subsequently, the deliveryman customer device 200 generates the OTP value based on the received session key $K_S$ and then applies the hash function to the generated OTP value N times. In this instance, the value applied to the hash function is a seed value of the OTP, and the seed value of the OTP may be defined below.

<Equation 1>

$$Seed = Nonce \| Time$$

Here, Nonce is a random number that does not overlap.

Subsequently, the deliveryman customer device 200 encrypts the OTP value to which the N number of hash functions is applied and transmits the encrypted secret key $K_S(h^N(Seed))$ to the server 100.

Additionally, the deliveryman customer device 200 applies the additional hash function M times to the OTP value to which the N number of hash functions was applied. The deliveryman customer device 200 transmits the OTP value $h^{N+M}(Seed)$ to which the hash function is applied N+M times to the autonomous delivery vehicle 400. In this instance, the OTP value $h^{N+M}(Seed)$ to which the hash function is applied N+M times may be converted into a QR code as described above and may be recognized by the autonomous delivery vehicle 400 as the first QR code.

Meanwhile, the server 100 transmits the encrypted secret key $K_S(h^N(Seed))$ received from the deliveryman customer device 200 to the buyer customer device 300.

Then, the buyer customer device 300 may decrypt the encrypted secret key $K_S(h^N(Seed))$ received from the server 100 by using the session key $K_S$. In addition, the buyer customer device 300 may transmit the OTP value $h^N(Seed)$ to which the decrypted hash function is applied N times to the autonomous delivery vehicle 400. In this instance, the OTP value h N (Seed) to which the decrypted hash function is applied N times may be converted into a QR code and may be recognized by the autonomous delivery vehicle 400 as data of the second QR code.

Subsequently, the autonomous delivery vehicle 400 may compare the OTP value $h^{N+M}(Seed)$ to which the hash function received from the deliveryman customer device 200 is applied N+M times with the OTP value $h^N(Seed)$ to which the decrypted hash function received from the buyer customer device 300 is applied N times.

Specifically, the autonomous delivery vehicle 400 applies the additional hash function M times to the OTP value $h^N(Seed)$ to which the decrypted hash function received from the buyer customer device 300 is applied N times. The autonomous delivery vehicle 400 determines if the generated OTP value $h^M(h^N(Seed))$ matches the OTP value $h^{N+M}(Seed)$ to which the hash function received from the deliveryman customer device 200 is applied N+M times.

According to an embodiment of present disclosure, since the first QR code of the deliveryman customer device 200 and the second QR code of the buyer customer device 300 are different, when a third party, not the delivery man or the buyer customer, intercepts the QR code between the two parties, the unmanned delivery system based on user authentication prevents the third party from receiving the product and hacking (man-in-the-middle attack). Moreover, since the QR code is one-time use, the QR code is generated in different forms each time, so there is no danger of reuse and overlap.

Figure 7:
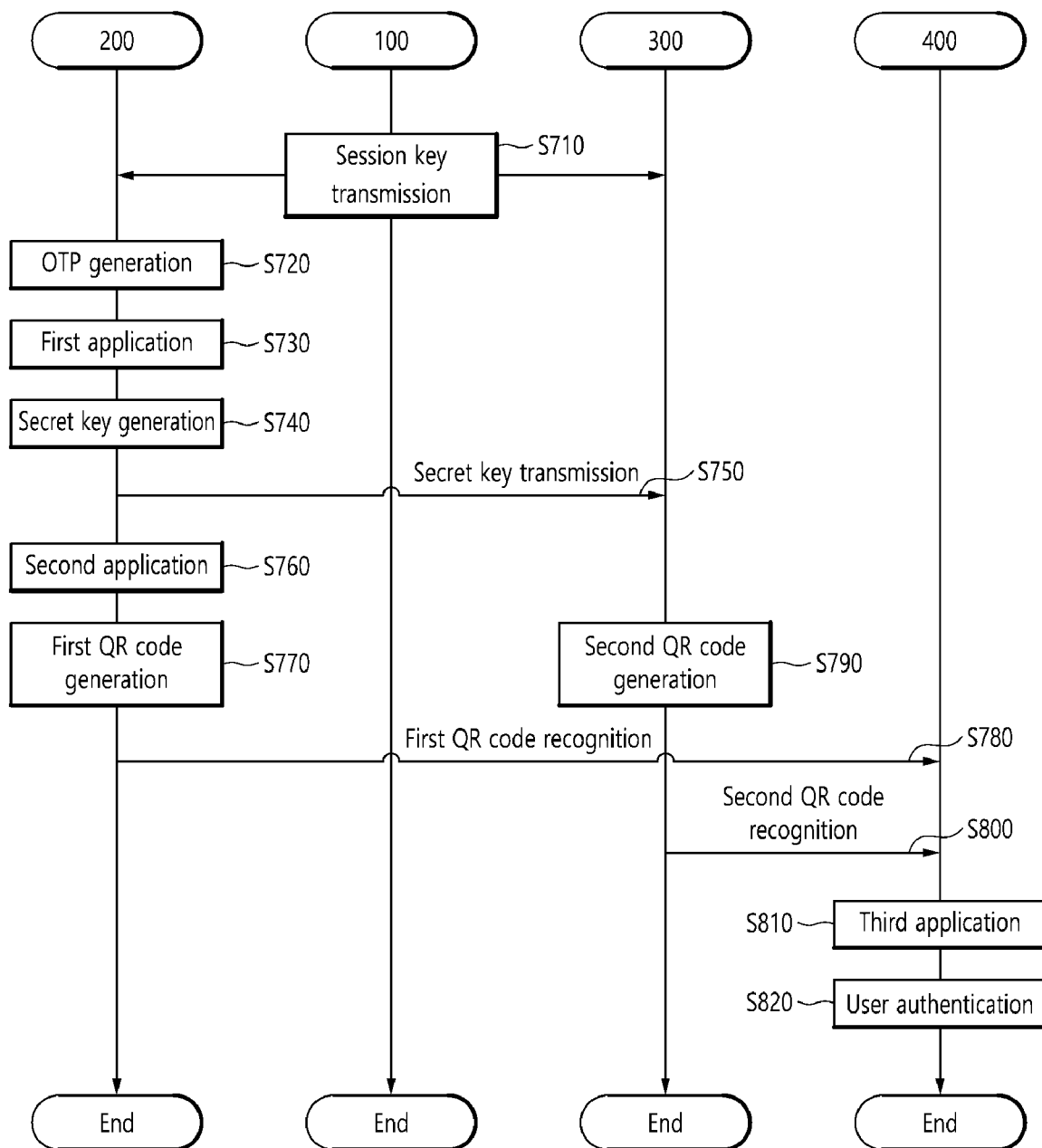
FIG. 7 is a flowchart of a user authentication method performed in an unmanned delivery system based on user authentication according to an embodiment of the present disclosure.

Meanwhile, FIG. 7 is a flowchart of the user authentication method performed in the unmanned delivery system based on user authentication according to an embodiment of the present disclosure, and in FIG. 7, the description that can be adequately inferred through FIGS. 2 to 5 described above or the overlapping description is omitted.

The user authentication method according to this embodiment may include a session key transmission step (S710), an OTP generation step (S720), a first application step (S730), a second application step (S760) and a first QR code generation step (S770).

The session key transmission step (S770) may be a step that the server 100 generates the session key based on the order information received from the buyer customer device 300 and transmits the generated session key to the deliveryman customer device 200 and the buyer customer device 300.

As described above, when the server 100 receives the order information from the buyer customer device 300, the server 100 may randomly generate the session key based on the time included in the order information. Subsequently, the server 100 may transmit the generated session key to the deliveryman customer device 200 and the buyer customer device 300.

The OTP generation step (S720) may be a step of generating, by the deliveryman customer device 200, the OTP based on the session key. The generation of the OTP may be performed when the authentication button is clicked by the delivery man on the deliveryman customer device 200.

Additionally, the first application step (S730) may be a step of applying, by the deliveryman customer device 200, the pre-stored hash function to the OTP generated in the OTP generation step (S720) the preset number of times.

In this instance, the user authentication method according to this embodiment may further include a secret key generation step (S740) and a secret key transmission step (S750).

The secret key generation step (S740) is a step that the deliveryman customer device 200 generates the secret key by encrypting the OTP generated in the first application step (S730), and the encrypted secret key may be generated by applying the symmetric key encryption algorithm to the OTP generated in the first application step (S760) to encrypt it.

Subsequently, the secret key transmission step (S750) may include transmitting the encrypted secret key generated in the secret key generation step (S740) to the buyer customer device 300 through the server 100.

Meanwhile, the second application step (S760) may be a step of additionally applying, by the deliveryman customer device 200, the hash function to the OTP generated in the first application step (S730) the preset number of times. Specifically, as described above, the hash function is additionally applied the preset number of times M to the OTP to which the hash function is applied the preset number of times N.

Additionally, the first QR code generation step (S770) may be a step of generating, by the deliveryman customer device 200, the first QR code based on the OTP generated in the second application step (S760). The generated first QR code may be recognized by the web camera of the autonomous delivery vehicle 400 in the first QR code recognition step (S780), and the first QR code recognized by the autonomous delivery vehicle 400 in the first QR code recognition step (S780) may be used for user authentication.

Additionally, the user authentication method according to this embodiment may further include a second QR code generation step (S790) and a user authentication step (S820).

The second QR code generation step (S790) may be a step of generating, by the buyer customer device 300, the second QR code that is different from the first QR code by decrypting the encrypted secret key by using the session key received from the server 100. Specifically, the encrypted secret key includes the OTP generated in the first application step (S730),so the second QR code includes the information associated with the OTP to which the hash function is applied the preset number of times. In contrast, the first QR code includes the OTP generated in the second application step (S760), so the first QR code and the second QR code may be generated in different code forms.

Additionally, after the second QR code generation step (S790) is performed, the second QR code recognition step (S800) of recognizing, by the web camera of the autonomous delivery vehicle 400, the second QR code outputted from the buyer customer device 300 may be performed.

Meanwhile, the user authentication step (S820) may be a step that the autonomous delivery vehicle 400 recognizes the first QR code and the second QR code and verifies the matching of cods. The user authentication step (S820) may include a third application step (S810).

The third application step (S810) is a step of additionally applying, by the autonomous delivery vehicle 400, the hash function the preset number of times to the OTP generated in the first application step (S730), included in the second QR code. After the third application step (S810) is performed, the user authentication step (S820) may verify the matching between the OTP generated in the third application step (S810) and the OTP included in the first QR code. When the original data included in the first QR code and the second QR code is identical and the authentication is completed, the process of opening the door may be performed.

According to an embodiment of present disclosure, since the first QR code of the deliveryman customer device 200 and the second QR code of the buyer customer device 300 are different, when any QR code is intercepted, the user authentication method prevents the hacker from receiving the product being delivered by the autonomous delivery vehicle 400. Moreover, since the QR code is one-time use, the QR code is differently generated each time, so there are dangers of reuse and overlap. Additionally, it is possible to transmit data with reliability by the data reception and transmission through the secure channel server 100, and since the delivery man or the buyer customer is only required to make the web camera of the autonomous delivery vehicle 400 recognize the QR code, the product may be conveniently stored or received without difficulties.

The user authentication method for unmanned delivery of the present disclosure may be implemented in the format of program instructions that may be executed through a variety of computer components and may be recorded in computer readable recording media. The computer readable recording media may include program instructions, data files and data structures alone or in combination The program instructions recorded in the computer readable recording media are specially designed and configured for the present disclosure and may be program instructions known and available to those having ordinary skill in the field of computer software.

Examples of the computer readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure.

While various embodiments of the present disclosure have been hereinabove illustrated and described, the present disclosure is not limited to the above-described particular embodiment, and various modifications may be made thereto by those skilled in the art without departing from the claimed subject matter of the present disclosure, and such modifications should not be individually understood from the technical spirit or scope of the present disclosure.

Detailed Description of Main Elements

100: Server 200: Buyer customer device
300: Deliveryman customer device 400: Autonomous delivery vehicle

What is claimed is:

1. A user authentication method performed in an unmanned delivery system including a server, a buyer customer device, a deliveryman customer device, and an autonomous delivery vehicle, the user authentication method comprising:
    generating, by the server, a session key based on order information received from the buyer customer device, and transmitting the generated session key to the deliveryman customer device and the buyer customer device;
    generating, by the deliveryman customer device, a One-Time Password (OTP) based on the session key;
    applying, by the deliveryman customer device as a first application step, a hash function to the generated OTP a first predetermined number of times;
    additionally applying, by the deliveryman customer device as a second application step, the hash function to the OTP generated in the first application step a second predetermined number of times; and
    generating, by the deliveryman customer device, a first Quick Response (QR) code based on the OTP generated in the second application step.

2. The user authentication method according to claim 1, further comprising:
    generating, by the deliveryman customer device, a secret key by encrypting the OTP generated in the first application step; and
    transmitting, by the deliveryman customer device, the generated secret key to the buyer customer device through the server.

3. The user authentication method according to claim 2, further comprising:
    generating, by the buyer customer device, a second QR code by decrypting the encrypted secret key using the session key, wherein the second QR code is different from the first QR code.

4. The user authentication method according to claim 3, further comprising: recognizing, by the autonomous delivery vehicle, the first QR code and the second QR code and determining whether the first QR code and the second QR code are based on the session key.

5. The user authentication method according to claim 4, the recognizing the first and second QR codes and determining whether the first and second QR codes match comprises:
    additionally applying, by the autonomous delivery vehicle as a third application step, the hash function to the OTP generated in the first application step and included in the second QR code the second predetermined number of times; and
    determining whether the OTP generated in the third application step and the OTP included in the first QR code match by comparing them.

* * * * *